Dec. 21, 1965  J. F. SPIELMAN  3,224,808
AIRCRAFT SEAT
Filed Jan. 17, 1964  4 Sheets-Sheet 1
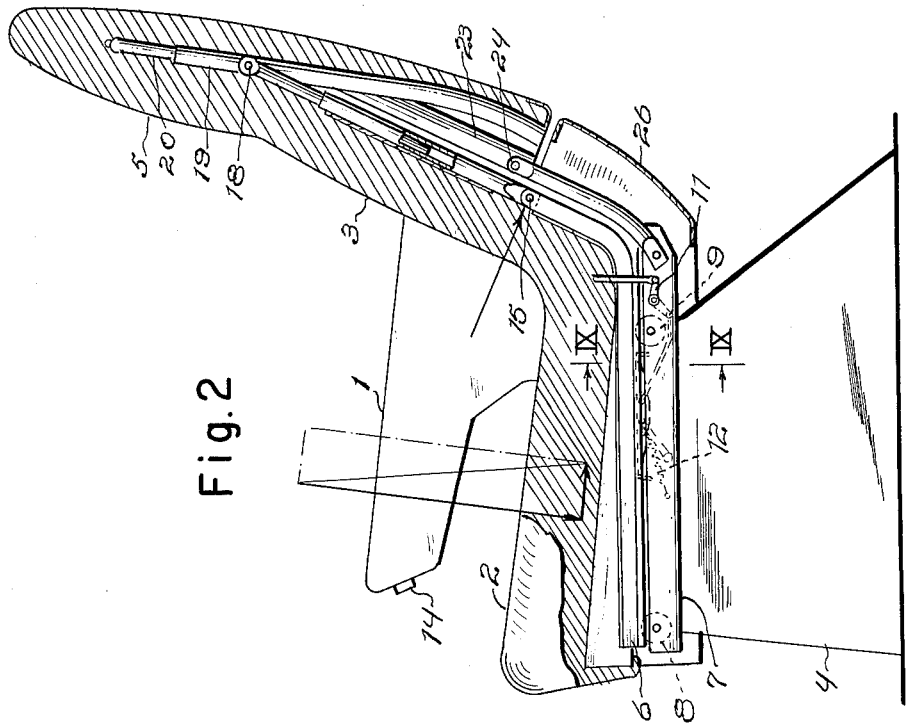
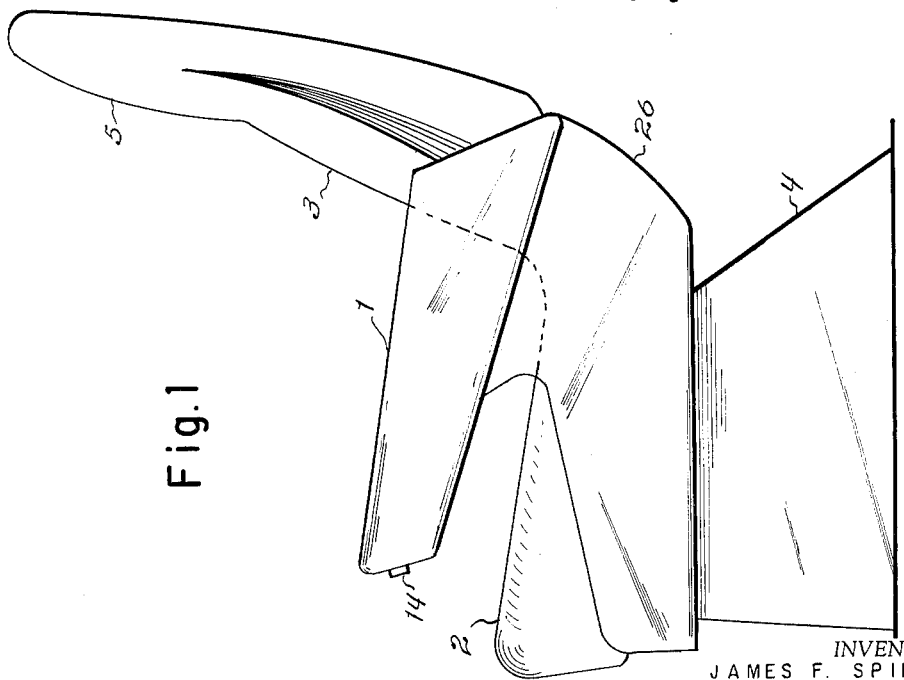
INVENTOR.
JAMES F. SPIELMAN
BY *Brown & Seward*
his ATTORNEYS

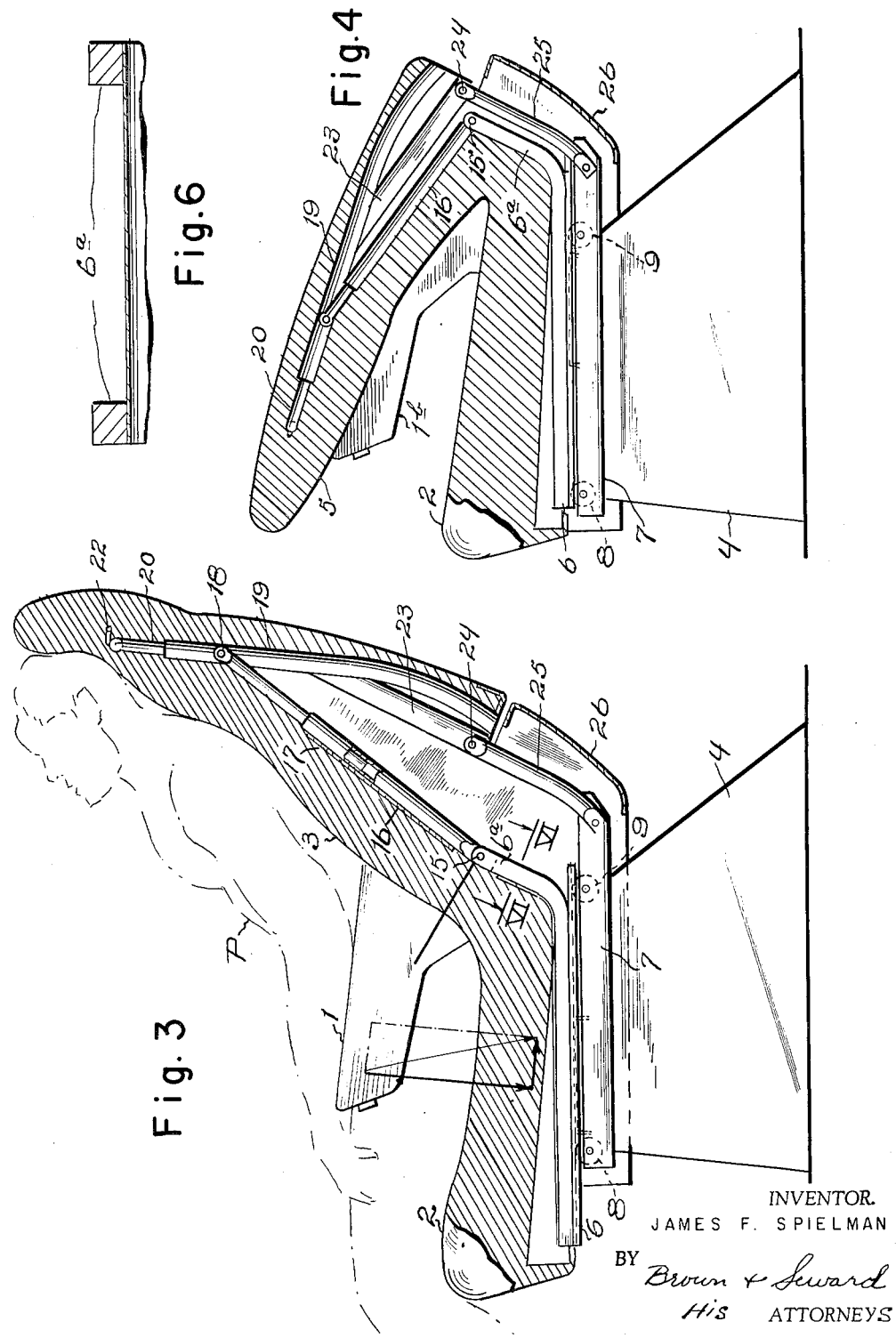

Dec. 21, 1965     J. F. SPIELMAN     3,224,808
AIRCRAFT SEAT
Filed Jan. 17, 1964     4 Sheets-Sheet 3

INVENTOR.
JAMES F. SPIELMAN
BY *Brown + Seward*
*His* ATTORNEYS

Dec. 21, 1965   J. F. SPIELMAN   3,224,808
AIRCRAFT SEAT

Filed Jan. 17, 1964   4 Sheets-Sheet 4

INVENTOR.
JAMES F. SPIELMAN
BY Brown & Seward
His ATTORNEYS

United States Patent Office 3,224,808
Patented Dec. 21, 1965

3,224,808
AIRCRAFT SEAT
James F. Spielman, Bantam, Litchfield, Conn., assignor, by mesne assignments, to Universal Oil Products Company, Des Plaines, Ill., a corporation of Delaware
Filed Jan. 17, 1964, Ser. No. 338,416
5 Claims. (Cl. 297—341)

My invention relates to passenger seats particularly adapted for use in aircraft in which each seat is adjustable in such a manner that support is automatically and continuously provided for the back, or lumbar region, of the passenger including when each individual seat is reclined.

The object of my invention is to provide a seat of the character described in which the seat includes articulating frames having a particular relation to the pivot for the connection with the back frames wherein said pivot moves in a right line during frame articulation.

Another object is to provide a seat having the characteristics outlined above and including a movable, resilient headrest mounted on a back frame.

Another object is to provide a seat including a back having fixed and movable elements in which telescoping elements connected to back and seat frames allow movement from a reclining position to a forward, folded position while the seat remains as a unit.

A further object is to provide a seat of the character described in which the above and other objects may effectively be attained, as will become apparent from the detailed specification which follows.

A practical embodiment of my invention is represented in the accompanying drawings in which the elements are indicated by the same numerals in the respective views.

Referring to the drawings—

FIG. 1 represents, in side elevation, a seat constructed according to my invention;

FIG. 2 represents, in side elevation, the embodiment shown in FIG. 1, same being partly broken away and partly in section;

FIG. 3 represents, in side elevation, the structure illustrated in FIGS. 1 and 2, partly in section and partly broken away, when the said structure has been adjusted to a partially reclining position; a passenger being indicated in dotted outline;

FIG. 4 represents the embodiment of my invention above described in which the seat has been folded forwardly, said view being partly broken away and partly in section;

FIG. 6 represents a transverse section taken on the line VI—VI of FIG. 3 looking in the direction of the arrows;

Broadly my invention comprises a seat, or plurality of seats, for airplanes in which the parts are so constructed and arranged that, through manual means operable from a seat arm, mechanism may be actuated to permit the seat to be slid forward and braked to a stop at the desired position. The forward motion of the seat is permitted by a pivoting connection slightly above the seat bottom level so that the lower back of the occupant will be continuously supported by the back of the seat.

The desired support for a passenger's back is provided due to the operative relationship of the upwardly projecting portions of the seat bottom upper movable frame to which telescopic elements, connected to the vertical back, are pivoted at their lower ends, and other back elements which are illustrated in FIG. 2. The upper portions of the telescopic elements are pivoted on the fixed back frame which in turn is engaged by an interior frame pivoted on the lower seat frame to permit the entire back to be folded forwardly.

The upper portion of the seat back is provided with a pair of opposed L-shaped arms which pivot about vertical axes at their lower ends at the sides of the upper ends of the fixed seat back frame and which are joined by a resilient member in such a manner that the passenger's head is cushioned thereby in conjunction with the usual seat padding.

Figure 5:
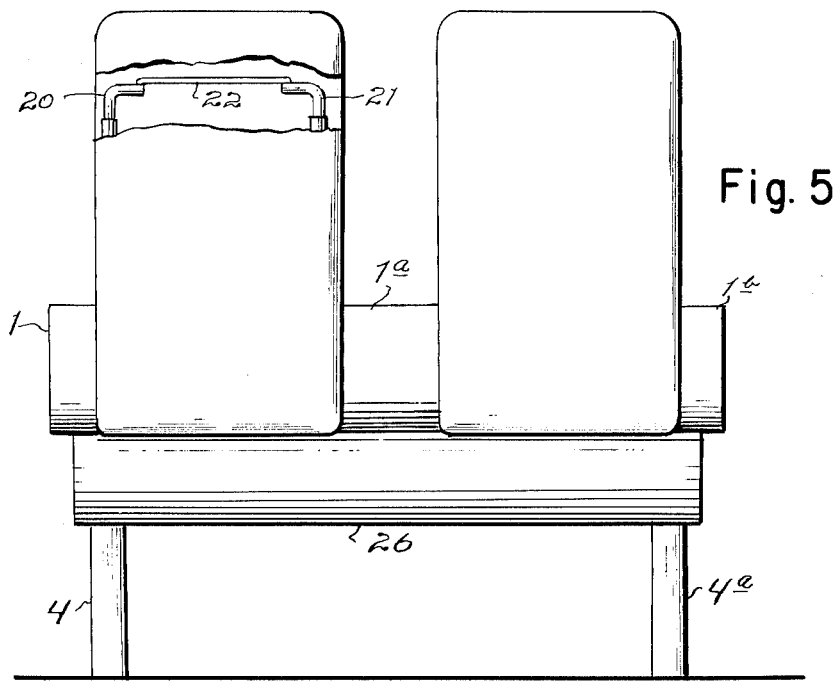
FIG. 5 represents a back view of a dual seat, the back of one seat having been partly broken away to illustrate a resilient headrest and its mounting.
Figures 9, 10:
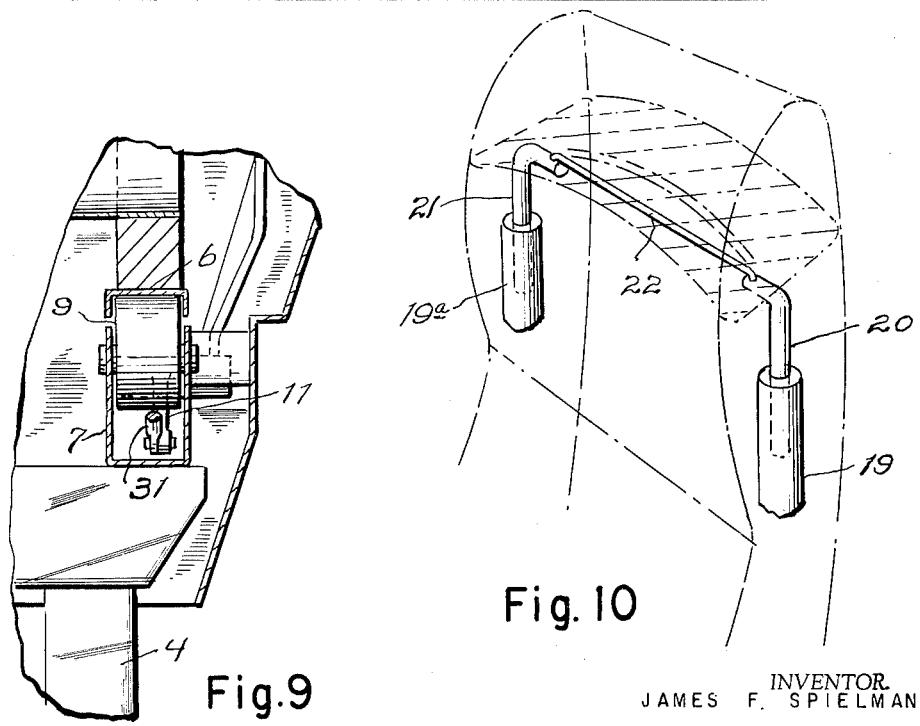
FIG. 9 is a detailed section on an enlarged scale taken on the line IX—IX of FIG. 2 looking in the direction of the arrows; and, FIG. 10 is a schematic perspective illustrating the action of the operative elements of the headrest portion of the seat both in use and not in use; the "in-use" position being illustrated by the dotted, curved lines representing the distorted movable elements.

Referring to the drawings in which the several parts are identified by the same numerals in the respective views, the seat arms of a two-passenger seat, (FIG. 5), are designated as 1, 1a and 1b.

The cushioned part of the seat is designated by 2 and the cushioned back portion of the seat which supports the passenger's back is 3. The back cover is 26.

The supports which mount the seat on the floor of the airplane are designated by 4 and 4a, and the part of the seat back which normally engages the passenger's head is identified by 5.

As shown in FIG. 2, a movable upper seat frame 6 rides on rollers 8 and 9 rotatably mounted in a fixed lower frame 7 at each side of the seat bottom.

Figure 7:
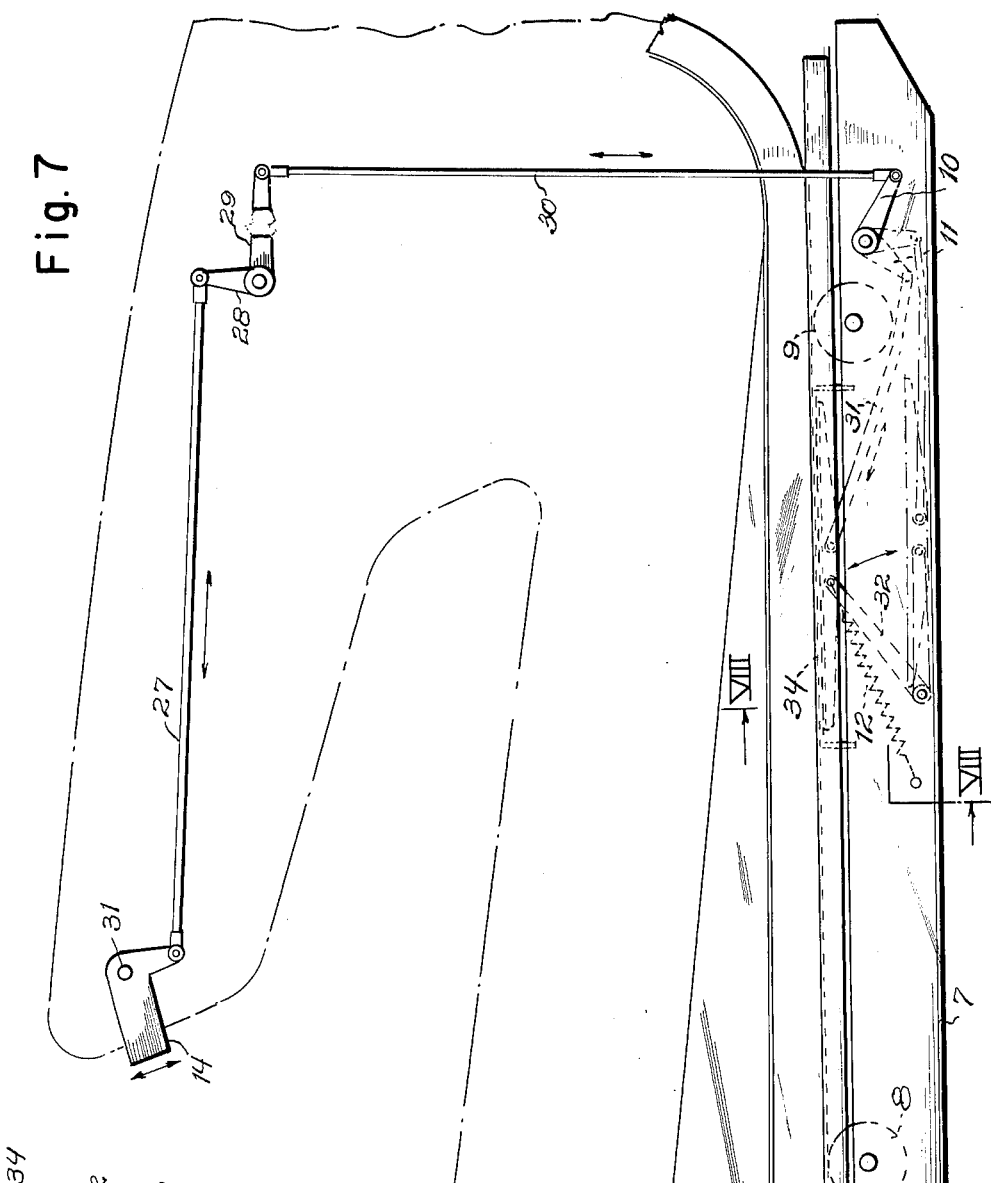
FIG. 7 is a representation on an enlarged scale illustrating the arrangement and action of certain of the elements when the seat is in the position illustrated in FIGS. 1 and 2.
Figure 8:
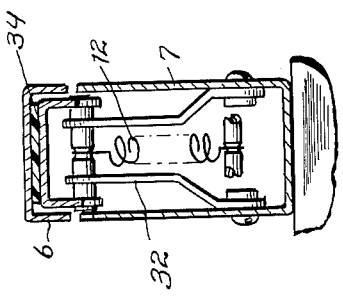
FIG. 8 represents a section partly broken away taken on the line VIII—VIII of FIG. 7 looking in the direction of the arrows.

The means for permitting the seat to be slid forwardly and backwardly to obtain the desired back support in accordance with the invention are clearly illustrated in FIGS. 7 and 8. A manually operated lever 14 is pivoted at 31 in the seat arm 1 (and 1b) and is connected to horizontal rod 27 connected through bell cranks 28 and 29 to a vertical rod 30. The rod 30 is connected to the bell crank 10 having an arm 11.

Said arm 11 is connected to a rod 31, the other end of which rod engages a brake shoe 34 connected to a lever 32 pivoted at 33 on the lower seat frame 7. A tension spring 12 is attached at one end to the upper end of the lever 32 and anchored at the other end thereof to the lower frame 7.

Carried by the levers 31 and 32 is the brake shoe 34, adapted to be moved by said levers and spring into and out of contact with the frame 6 of the seat when the said frame has attained its desired longitudinal adjustment. Thus, a passenger in the seat can adjust the seat bottom in a fore and aft direction to attain a comfortable backrest angle.

As illustrated in FIGS. 3 and 4, not only is the seat adjustable longitudinally for passenger comfort, but it may be folded over as shown in FIG. 4 due to the relationship of pivot points 15 and 24.

The desired supporting effect of the seat is clearly illustrated in FIG. 3 in which identical telescopic tube members 16 are pivoted at 15 to uprising arms 6a at each side of the frame 6 and telescopic members 17, which members are received within the telescopic tube members 16 in slidable engagement therewith, and which are pivoted at 18 to the stationary seat frame back members 19.

As indicated above, the headrest portion of the seat back is supported on a pair of L-shaped arms 20 pivotably mounted in the back members 19 and carrying a resilient member 22 stretched therebetween.

It will be noted that a back frame 23 is pivoted at 24 in arms 25 for folding the unoccupied seat forwardly for handling or other reasons. (See FIG. 4.)

Assume that the seat is occupied by a passenger and it is desired to move the seat from the position shown in FIGS. 1 and 2 to the position shown in FIG. 3 or to any stage intermediate these two positions. To accomplish this it is necessary to manually actuate the lever 14 which moves elements 27, 28, 29, 30, 10, 11 and 31. This serves to overcome the tension of the spring 12 and withdraw the shoe 34 supported on arms 31 and 32 from contact with the frame 6. This permits the frame 6 to roll longitudinally on the rollers 8 and 9 mounted in the lower frame 7. When the frame 6 has attained a desired position (such as shown in FIG. 3), the lever 14 may be released, which permits the spring 12 to contract and draw the shoe 34 into contact with the frame 6 and releasably hold same in its desired position, which may be as exemplified in FIG. 3.

It should be noted that during the movement of frame 6 relative to frame 7 the seat back, due to its construction as outlined above, pivots at 15 and said point moves in a right line and affords constant support to the lumbar region of the passenger without tilting the back of the seat into the lap of the passenger seated behind same.

To return the seat position from that shown in FIG. 3 to that of FIG. 1 or 2, it is merely necessary to actuate the lever 14 to release the shoe 34 from the frame 6 and push the seat in an aft direction, i.e., to the right as viewed in FIG. 3.

It will be understood that each seat is adjustable individually even though mounted in double or triple passenger units.

Since it is evident that various changes may be made in the form, construction or arrangement of the several elements without departing from the spirit and scope of my invention, I do not intend to be limited to that embodiment herein shown and described except as set forth in the appended claims.

What I claim is:

1. A passenger seat comprising a base, a lower seat frame fixed on said base, an upper seat frame movable longitudinally with respect to said lower seat frame, uprising arms on the rear of said upper and lower seat frames, a seat back comprising interconnected members, one of said back members being swingably connected to the lower fixed seat frame arms and means pivotally connecting the other back member to the upper seat frame arms substantially above the horizontal plane level of the upper seat frame, said last-named means comprising telescopic members permitting longitudinal movement of the upper seat frame with respect to the lower seat frame and the swingably connected back member whereby the pivotal connection means between the back member and the upper seat frame arms is caused to travel in a right line parallel to said upper seat frame during longitudinal movement of said seat frame so that the seat back gives continual support for the lumbar region of a passenger in said seat.

2. The combination according to claim 1 in which the said back comprising interconnected members is provided at its upper end with a resilient head supporting member comprising opposed horizontally swingable members and a resilient member supported therebetween.

3. The combination according to claim 1 which includes means for maintaining the upper and the lower seat frames in a fixed relationship whereby the seat back may be folded forwardly without relative movement of the upper and lower seat frames.

4. The combination according to claim 1 in which the seat is provided with arms, and means for releasably maintaining the upper and lower seat frames in a predetermined fixed relationship are located in a seat arm.

5. The combination according to claim 1 in which the telescopic members comprise elements pivoted at one end to the upper ends of the upper seat frame arms and at the other end to the upper portion of a back member whereby relative movement of the pivot point of said telescopic members with the upper end of the arms of the upper seat frame may be accomplished without moving the back members.

References Cited by the Examiner

UNITED STATES PATENTS

| | | | |
|---|---|---|---|
| 677,234 | 6/1901 | Kelly | 297—343 |
| 1,762,623 | 6/1930 | Hess | 297—378 |
| 2,285,112 | 6/1942 | Dorton | 297—343 |
| 2,479,175 | 8/1949 | McArthur | 297—318 |
| 2,497,395 | 2/1950 | Cramer | 297—342 |
| 2,673,593 | 3/1954 | Hendrickson | 297—342 |
| 2,953,103 | 9/1960 | Bohannon | 297—318 |
| 3,001,821 | 9/1961 | Marechal | 297—379 |
| 3,019,050 | 6/1962 | Spielman | 297—343 |

FOREIGN PATENTS

| | | |
|---|---|---|
| 852,467 | 2/1940 | France. |
| 471,063 | 5/1952 | Italy. |
| 468,094 | 6/1937 | Great Britain. |
| 591,920 | 9/1947 | Great Britain. |
| 593,542 | 10/1947 | Great Britain. |
| 882,435 | 11/1961 | Great Britain. |

FRANK B. SHERRY, *Primary Examiner.*